United States Patent
Pozhenko et al.

(10) Patent No.: US 7,907,538 B2
(45) Date of Patent: Mar. 15, 2011

(54) METHOD AND APPARATUS FOR CONTROLLING PARAMETERS OF WIRELESS DATA STREAMING SYSTEM

(75) Inventors: Mikhail Pozhenko, Suwon-si (KR); Sang-bum Suh, Seoul (KR); Sung-kwan Heo, Seoul (KR); Jae-wook Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 902 days.

(21) Appl. No.: 11/713,695

(22) Filed: Mar. 5, 2007

(65) Prior Publication Data

US 2007/0206635 A1    Sep. 6, 2007

(30) Foreign Application Priority Data

Mar. 3, 2006 (KR) .................. 10-2006-0020391

(51) Int. Cl.
*G01R 31/08* (2006.01)
*H04J 1/16* (2006.01)
*H04L 1/00* (2006.01)
(52) U.S. Cl. .................. 370/252; 370/230; 370/235
(58) Field of Classification Search .................. None
See application file for complete search history.

(56) References Cited

U.S. PATENT DOCUMENTS

| 6,785,227 | B1 * | 8/2004 | Lu et al. ..................... | 370/229 |
| 2004/0095906 | A1 * | 5/2004 | Rajkotia ..................... | 370/332 |
| 2005/0213502 | A1 * | 9/2005 | Convertino et al. ........ | 370/229 |
| 2006/0140146 | A1 * | 6/2006 | Funk et al. .................. | 370/329 |
| 2006/0259627 | A1 * | 11/2006 | Kellerer et al. ............ | 709/227 |
| 2006/0268933 | A1 * | 11/2006 | Kellerer et al. ............ | 370/469 |

FOREIGN PATENT DOCUMENTS

WO    WO 2005004432 A1 *    1/2005

OTHER PUBLICATIONS

Qingwen, L., et al., "Cross-Layer Modeling of Adaptive Wireless Links for QoS Support in Multimedia Networks", Quality of Service in Heterogeneous Wired/Wireless Networks, QSHINE, Oct. 18, 2004. p. 68-75 IEEE, Piscataway, NJ, USA.
Liu, Q., et al., "Cross-Layer Combining of Adaptive Modulation and Coding with Truncated ARQ Over Wireless Links", IEEE Transactions on Wireless Communications, Sep. 2004, p. 1746-1755, vol. 3, No. 5, IEEE Service Center, Piscataway, NJ, US.
Raisinghani, V.T., et al., "Cross-Layer design optimizations in wireless protocol stacks", Computer Communications, May 2004, p. 720-724, vol. 27, No. 8, Elsevier Science Publishers BV, Amsterdam, NL.
Srivastava, V., et al., "Cross-Layer Design: A Survey and the Road Ahead", IEEE Communications Magazine, Dec. 2005, p. 112-119, IEEE Service Center, New York, NY, US.

* cited by examiner

*Primary Examiner* — Daniel J Ryman
*Assistant Examiner* — Cassandra Decker
(74) *Attorney, Agent, or Firm* — Sughrue Mion, PLLC

(57) ABSTRACT

A method and apparatus for controlling parameters of a wireless data streaming system are provided. The method of controlling parameters of a wireless data streaming system includes controlling first parameters, which can be controlled in units of individual packets, according to a current packet transmission state in a data stream; transmitting a predefined number of packets using the first parameters and obtaining statistical information regarding use of the first parameters in the transmission of the predefined number of packets; and controlling second parameters, which can be controlled in units of packet groups, with reference to the statistical information and a desired quality of service (QoS).

12 Claims, 5 Drawing Sheets

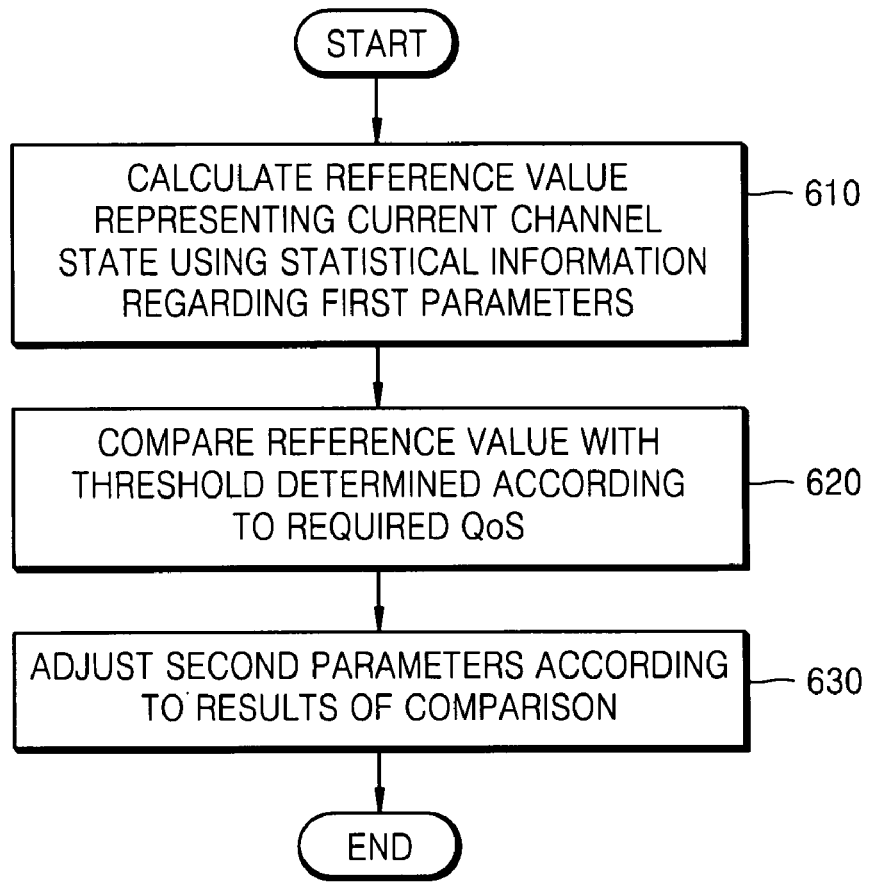
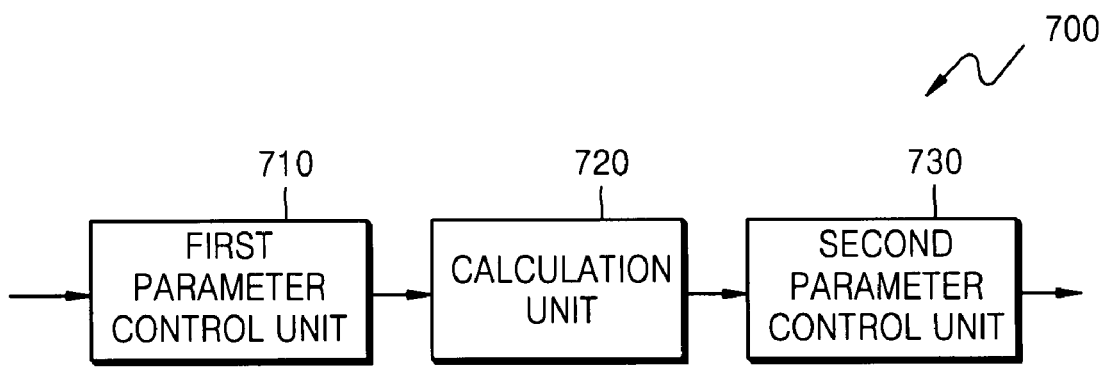

METHOD AND APPARATUS FOR CONTROLLING PARAMETERS OF WIRELESS DATA STREAMING SYSTEM

CROSS-REFERENCE TO RELATED PATENT APPLICATION

This application claims priority from Korean Patent Application No. 10-2006-0020391, filed on Mar. 3, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to data communication, and more particularly, to a method and apparatus for controlling parameters of a wireless data streaming system which can adaptively control the parameters when transmitting a data stream via a wireless channel.

2. Description of the Related Art

The network performance of wireless communication systems changes frequently due to the time-varying and fading characteristics of wireless communication channels. Related art wireless communication systems ensure a required quality of services (QoS) by selectively controlling a plurality of parameters of a predetermined layer. However, related art wireless communication systems may not be able to guarantee satisfactory performance when the properties of wireless communication channels change. Also, related art wireless communication systems control a plurality of parameters using a hierarchical system architecture comprised of a plurality of independent layers and thus may not be able to achieve a required QoS.

SUMMARY OF THE INVENTION

The present invention provides a method and apparatus for controlling parameters of a wireless data streaming system which can enhance the data transmission performance of the wireless data streaming system by efficiently utilizing wireless network resources in consideration of the ever-changing properties of wireless communication channels.

According to an aspect of the present invention, there is provided a method of controlling parameters of a wireless data streaming system comprising: controlling a plurality of first parameters, which can be controlled in units of individual packets, according to a current packet transmission state in a data stream; transmitting a predefined number of packets using the first parameters and obtaining statistical information regarding use of the first parameters in the transmission of the predefined number of packets; and controlling a plurality of second parameters, which can be controlled in units of packet groups, with reference to the statistical information and a desired quality of service (QoS).

According to another aspect of the present invention, there is provided an apparatus for controlling parameters of a wireless data streaming system comprising: a first parameter control unit which controls a plurality of first parameters, which can be controlled in units of individual packets, according to a current packet transmission state in a data stream; a calculation unit which transmits a predefined number of packets using the first parameters and obtains statistical information regarding use of the first parameters in the transmission of the predefined number of packets; and a second parameter control unit which controls a plurality of second parameters, which can be controlled in units of packet groups, with reference to the statistical information and a desired quality of service (QoS).

BRIEF DESCRIPTION OF THE DRAWINGS

The above and other features and aspects of the present invention will become more apparent by describing in detail exemplary embodiments thereof with reference to the attached drawings in which:

FIG. 6 is a detailed flowchart illustrating the controlling of the second parameters as performed in the method illustrated in FIG. 5, according to an exemplary embodiment of the present invention; and FIG. 7 is a block diagram of an apparatus for controlling parameters of a wireless data streaming system according to an exemplary embodiment of the present invention.

DETAILED DESCRIPTION OF THE EXEMPLARY EMBODIMENTS OF THE INVENTION

The present invention will now be described more fully with reference to the accompanying drawings in which exemplary embodiments of the invention are shown.

Figure 1:
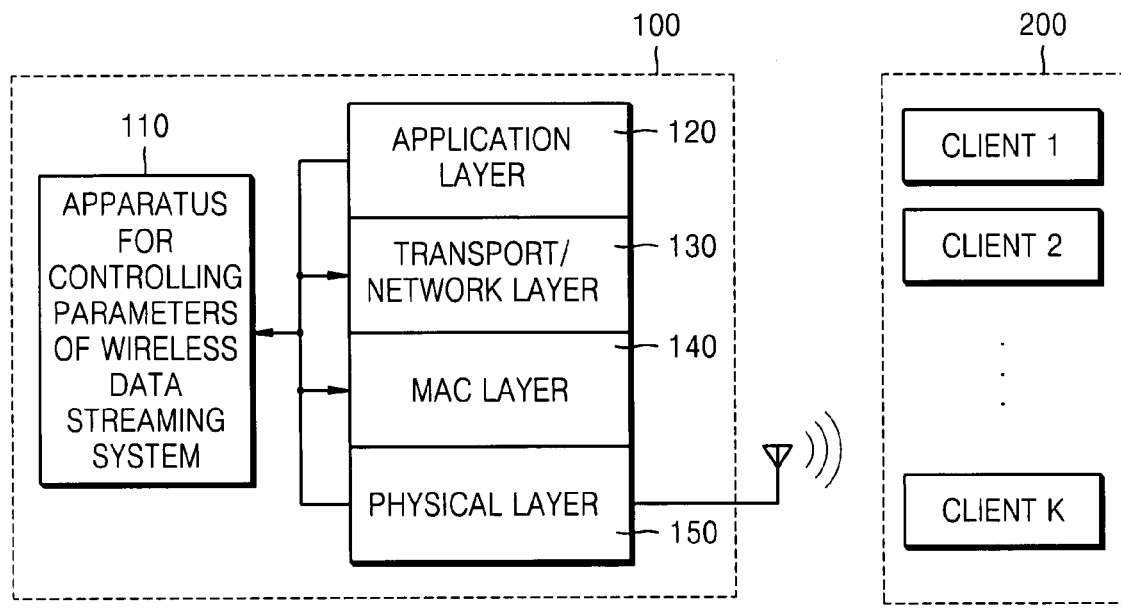
FIG. 1 is a block diagram of a wireless data streaming system including an apparatus for controlling parameters of a wireless data streaming system according to an exemplary embodiment of the present invention.

FIG. 1 is a block diagram of a wireless data streaming system including an apparatus 110 for controlling parameters of a wireless data streaming system according to an exemplary embodiment of the present invention. Referring to FIG. 1, the apparatus 110 is characterized by adaptively controlling a plurality of long-term parameters, i.e., layer parameters which are controlled over a long period of time, of the wireless data streaming system based on information regarding a plurality of short-term parameters i.e., layer parameters which are controlled within a short period of time, of the wireless data streaming system. The wireless streaming data system includes a transmission unit 100 which transmits multimedia data such as voice data, audio data, and video data, and a plurality of clients 200. The apparatus 110 is located at a transmission terminal of the wireless data streaming system. The apparatus 110 controls a plurality of parameters of a media access control (MAC) layer 140 and a physical layer 150 in units of individual packets which are the minimal units of data that can be transmitted, determines a current channel state based on statistical data obtained from the use of the parameters of the MAC layer 140 and the physical layer 150 for transmitting a predefined number of packets, and adjusts a plurality of parameters of an application layer 120 and a transport/network layer 130 based on the results of the determination. In other words, the apparatus 110 determines the current channel state based on information regarding a plurality of short-term parameters of layers which can be controlled within a short period of time, and adjusts a plurality of long-term parameters of layers which are controlled within a longer period of time than the short-term parameters. The short-term parameters will now be referred to as first parameters, and the long-term parameters which can be controlled only after transmission of a predefined number of packets will now be referred to as second parameters. The parameters of the MAC layer 140 and the physical layer 150 can be readily controlled in units of individual packets and are thus classified as first parameters, whereas the parameters of the transport/network layer 130 and the application layer 120 can be controlled only after transmission of a predefined number of packets and are thus classified as second parameters.

Examples of the parameters of the MAC layer 140 and the physical layer 150, which are classified as first parameters, include transmission power, data rate, equalization information, retry limits, frame length, ready-to-send (RTS) rate, and clear-to-send (CTS) rate. Examples of the parameters of the transport/network layer 130 and the application layer 120, which are classified as second parameters, include congestion window size, packet size, buffer size, forward error correction coding rate, interleaving packet size, concealment, post-processing codec information, and stream quantity.

Figure 2:
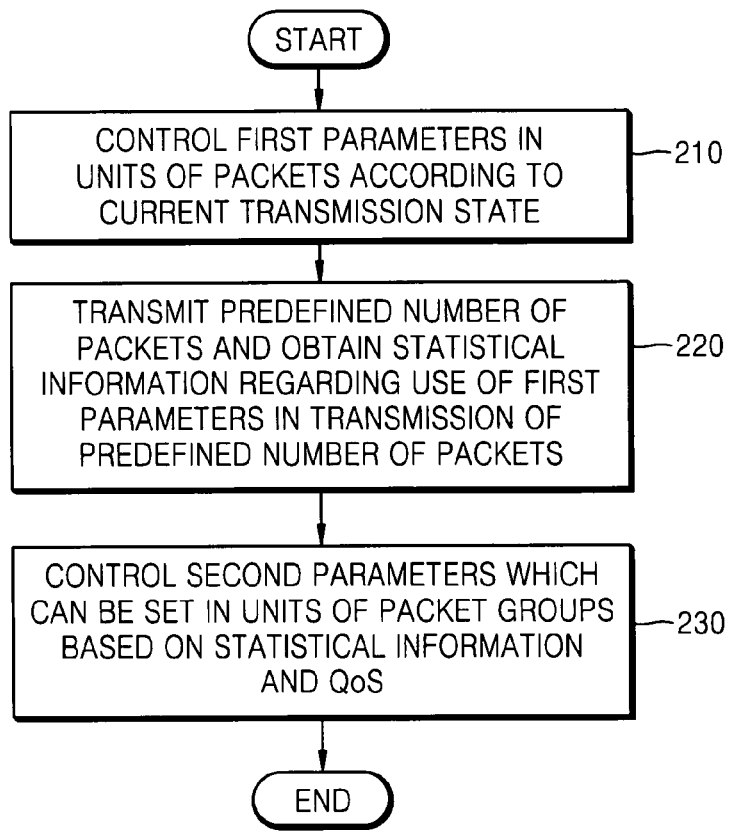
FIG. 2 is a flowchart illustrating a method of controlling parameters of a wireless data streaming system according to an exemplary embodiment of the present invention.

FIG. 2 is a flowchart illustrating a method of controlling parameters of a wireless data streaming system according to an exemplary embodiment of the present invention. Referring to FIG. 2, in operation 210, a plurality of first parameters such as parameters of a MAC layer and a physical layer which can be controlled in units of individual packets are controlled according to a current transmission state of a plurality of packets in a data stream. The current transmission state can be determined according to whether acknowledgement (ACK) are received in return for packets currently being transmitted. In operation 220, a predefined number of packets are transmitted using the first parameters, and statistical data regarding the use of the first parameters in the transmission of the predefined number of packets is obtained. For example, a plurality of packets in a data stream can be transmitted at arbitrary data rates. If the predefined number of packets are transmitted via a wireless channel for which a plurality of data rates, e.g., data rates of 54 Mbps, 48 Mbps, 36 Mbps, 24 Mbps, 18 Mbps, 12 Mbps, and 6 Mbps, are provided as default data rates, the predefined number of packets transmitted at each of the default rates is counted, thereby obtaining statistical data regarding the use of a first parameter 'data rate' in the transmission of the predefined number of packets. The statistical data can be used later to determine a reference value using a predetermined function. The reference value can be used to determine a current channel state by being compared with a predetermined threshold value which is determined in consideration of a desired quality of service (QoS). The determination of the reference value and the current channel state will be described later in further detail. In operation 230, a plurality of second parameters such as parameters of a transport/network layer and an application layer are controlled in units of packet groups according to the results of the determination of the current channel state.

Figure 3:
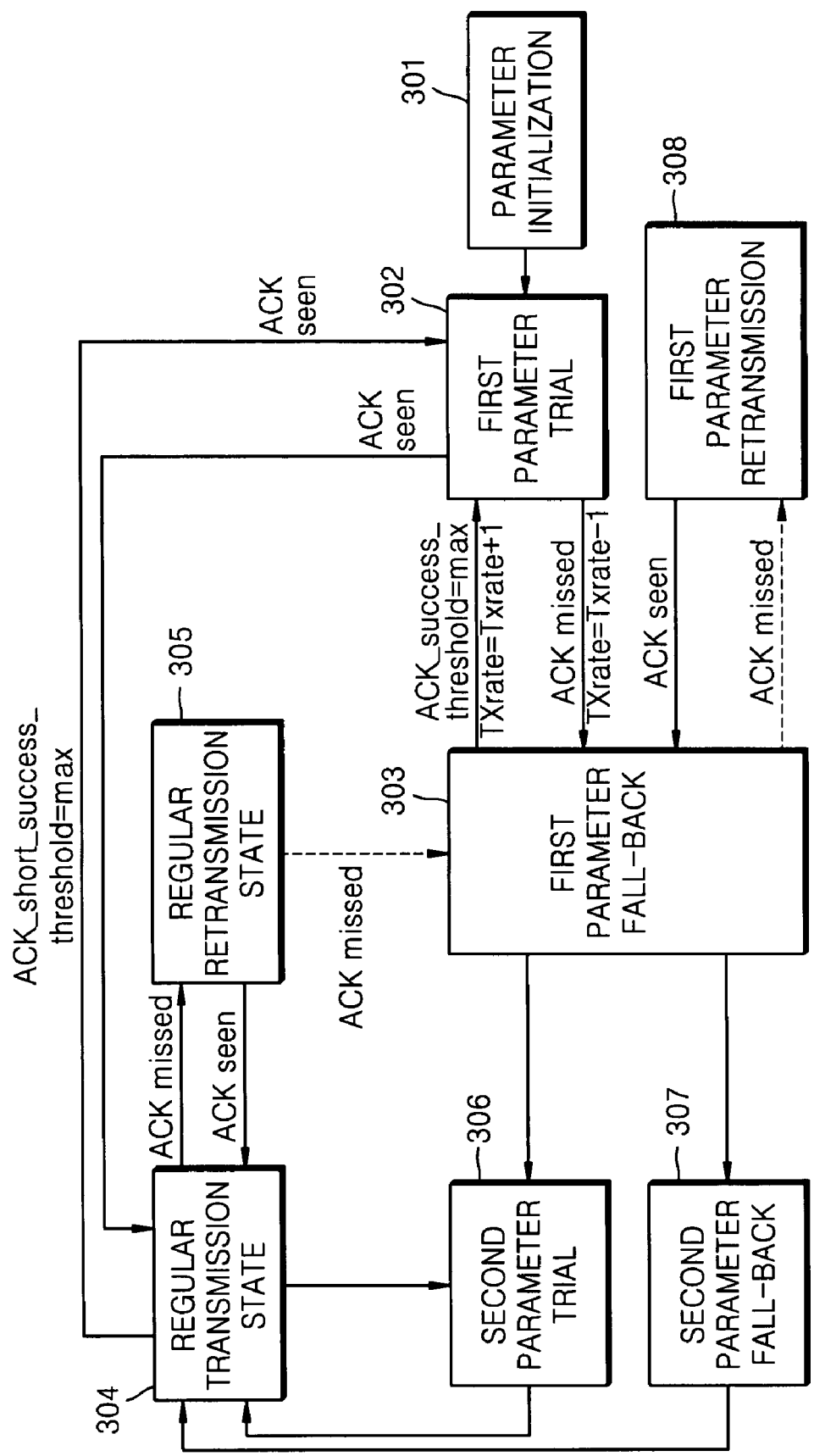
FIG. 3 is a block diagram for explaining a method of controlling parameters of a wireless data streaming system according to another exemplary embodiment of the present invention.
Figure 4:
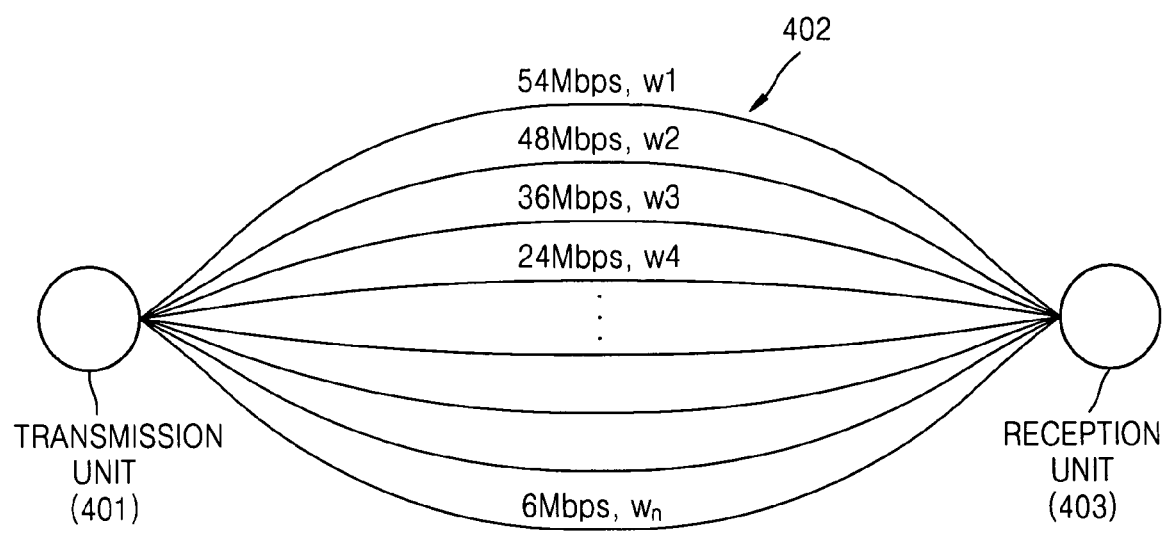
FIG. 4 is a diagram for explaining an aspect of the method illustrated in FIG. 3, which illustrates a wireless channel provided with various data rates according to an exemplary embodiment of the present invention.

FIG. 3 is a block diagram for explaining a method of controlling parameters of a wireless data streaming system according to another exemplary embodiment of the present invention, and FIG. 4 is a diagram for explaining an aspect of the method illustrated in FIG. 3, which illustrates a wireless channel provided with various data rates according to an exemplary embodiment of the present.

Referring to FIG. 3, in operation 301, parameters of all layers of a wireless data streaming system are respectively initialized to predefined default values. In operation 302, an actual data packet or a test data packet is transmitted according to the results of the initialization, and it is determined whether first parameters need to be adjusted according to whether an acknowledgement (ACK) has been received in return for the actual data packet or the test data packet. If an ACK has been received in return for the actual data packet or the test data packet transmitted in operation 302, the method proceeds to operation 304. In operation 304, packets are transmitted in a regular transmission state. However, if no ACK frame has been received in return for the actual data packet or the test data packet transmitted in operation 302, it is determined that data will not be transmitted properly according to the results of the initialization, and therefore the method proceeds to operation 303.

In operation 303, the first parameters from among a variety of parameters used to transmit data and which can be controlled in units of individual packets are all reduced by one notch according to a current channel state. For example, referring to FIG. 4, if a first parameter 'data rate' was initialized to a default data rate of 54 Mbps in operation 301 and no ACK was received in return for an actual data packet or a test data packet transmitted at a data rate of 54 Mbps in operation 302, then the first parameter 'data rate' is reduced by one notch from 54 Mbps to 48 Mbps, and a plurality of packets are transmitted at the reduced data rate, i.e., at a data rate of 48 Mbps, in operation 303.

If no ACK frame has been received in return for the packets transmitted in operation 303, the method proceeds to operation 308. In operation 308, a plurality of packets are transmitted at the same rate as in operation 303. If an ACK is received in return for the packets transmitted in operation 308, the method returns to operation 303. The number of packets transmitted in operation 308 is limited. If this limited number of packets are not transmitted properly in operation 308 at the same rate as in operation 303, it is determined that the adjustment of the first parameters performed in operation 303 is insufficient to guarantee a proper transmission of data in the current channel state, and the method proceeds to operation 307.

If a packet quantity ACK_success_threshold representing the number of packets which have been successfully transmitted at the reduced first parameter values obtained in operation 303 exceeds a predetermined threshold value max, the first parameters are increased by one notch, and the method returns to operation 302. For example, if the number of packets which have been successfully transmitted at the reduced data rate obtained in operation 303, i.e., at a data rate of 48 Mbps, reaches the predefined threshold value max, the first parameter 'data rate' is increased by one notch from 48 Mbps to 54 Mbps, and the method returns to operation 302. According to the present exemplary embodiment, the first parameters may be controlled together or separately from one another using the aforementioned method.

In operation 304, data is transmitted according to the first parameters which are respectively set to optimum values corresponding to an optimum channel state, and this type of transmission state is referred to as the regular transmission state. Data is transmitted in the regular transmission state as long as packets are successfully transmitted. However, if packet loss occurs at least one time during the transmission of packets in the regular transmission state, the method proceeds to operation 305, and the current transmission state is switched from the regular transmission state to a regular retransmission state. If packet loss occurs during the transmission of packets in the regular retransmission state, the method returns to operation 303.

In the meantime, a reference value W which is needed to adjust the second parameters is determined by using a predetermined function with statistical data regarding the use of the first parameters in the transmission of a predefined number of packets, e.g., M packets (where M is an integer). For example, assume that data rates of 54 Mbps, 48 Mbps, 36 Mbps, 24 Mbps, through to, 6 Mbps are provided for a wireless channel between a transmission unit 401 and a reception unit 403 as default data rates, as illustrated in FIG. 4, and that, of a total of fourteen packets transmitted between the transmission unit 401 and the reception unit 404, seven packets were transmitted at a default data rate of 54 Mbps, three packets at a data rate of 48 Mbps, two packets at a default data rate of 36 Mbps, and two packets at a default data rate of 24 Mbps. The reference value W is obtained by determining the quantity of packets transmitted at each of the default data rates, respectively multiplying the determined packet quantities by a plurality of weight values $w_1$, $w_2$, $w_3$, $w_4$ through to $w_n$ given to the default data rates, and adding up the results of the multiplication. Accordingly, the reference value W can be determined for the above example as indicated by the following equation:

$$W=7w_1+3w_2+2w_3+2w_4.$$

Referring to FIG. 3, the reference value W is compared with a predetermined threshold value which is determined in consideration of a required QoS. Thereafter, the method proceeds to operation 306 or 307 according to the results of the comparison. In detail, if a weight value given to a high data rate is greater than a weight value given to a low data rate, e.g., if $w_1$=20, $w_2$=15, $w_3$=10, and $w_4$=5, then the reference value W is 215. Assuming that the predetermined threshold value is determined to be in the range of a lower limit of 100 and an upper limit of 200 in consideration of a required QoS, the method proceeds to operation 306 since the reference value W is greater than the upper limit of the range of the predetermined threshold value. If the reference value W is smaller than the lower limit of the range of the predetermined threshold value, the method proceeds to operation 307.

In operation 306, a plurality of second parameters are respectively adjusted based on the current channel state to a plurality of values corresponding to a more efficient, but less stable channel state than the current channel state. Examples of the second parameters include 'forward error correction coding rate', 'interleaving depth', and 'interleaving packet size'. The second parameters 'forward error correction coding rate', 'interleaving depth', and 'interleaving packet size' are related to redundancy of data streams. Therefore, if the current channel state is determined to be good, it is expected that data will be properly transmitted even after the second parameters 'forward error correction coding rate', 'interleaving depth', and 'interleaving packet size' are reduced.

In operation 307, the second parameters are respectively adjusted to a plurality of values corresponding to a more stable, but less efficient channel state than the current channel state. In operation 307, if the current channel state is determined to be poor, the second parameters 'forward error correction coding rate', 'interleaving depth', and 'interleaving packet size' are increased based on the current channel state, thereby ensuring a more stable, but less efficient data transmission than in the current channel state. According to an exemplary embodiment of the present invention, in operations 306 and 307, the reference value W may be compared with the threshold value determined in consideration of the required QoS, one of a plurality of parameter value subsets may be chosen according to the results of the comparison, and the second parameters may be respectively set to a plurality of parameter values included in the chosen parameter value subset. In addition to the results of the comparison, the number of failed packet transmissions, the number of successful packet transmissions, and the number of packet retransmissions can also be taken into consideration when choosing one of the parameter value subsets. For this, a plurality of counters may be used to count the number of failed packet transmissions, the number of successful packet transmissions, and the number of packet retransmissions.

Figure 5:
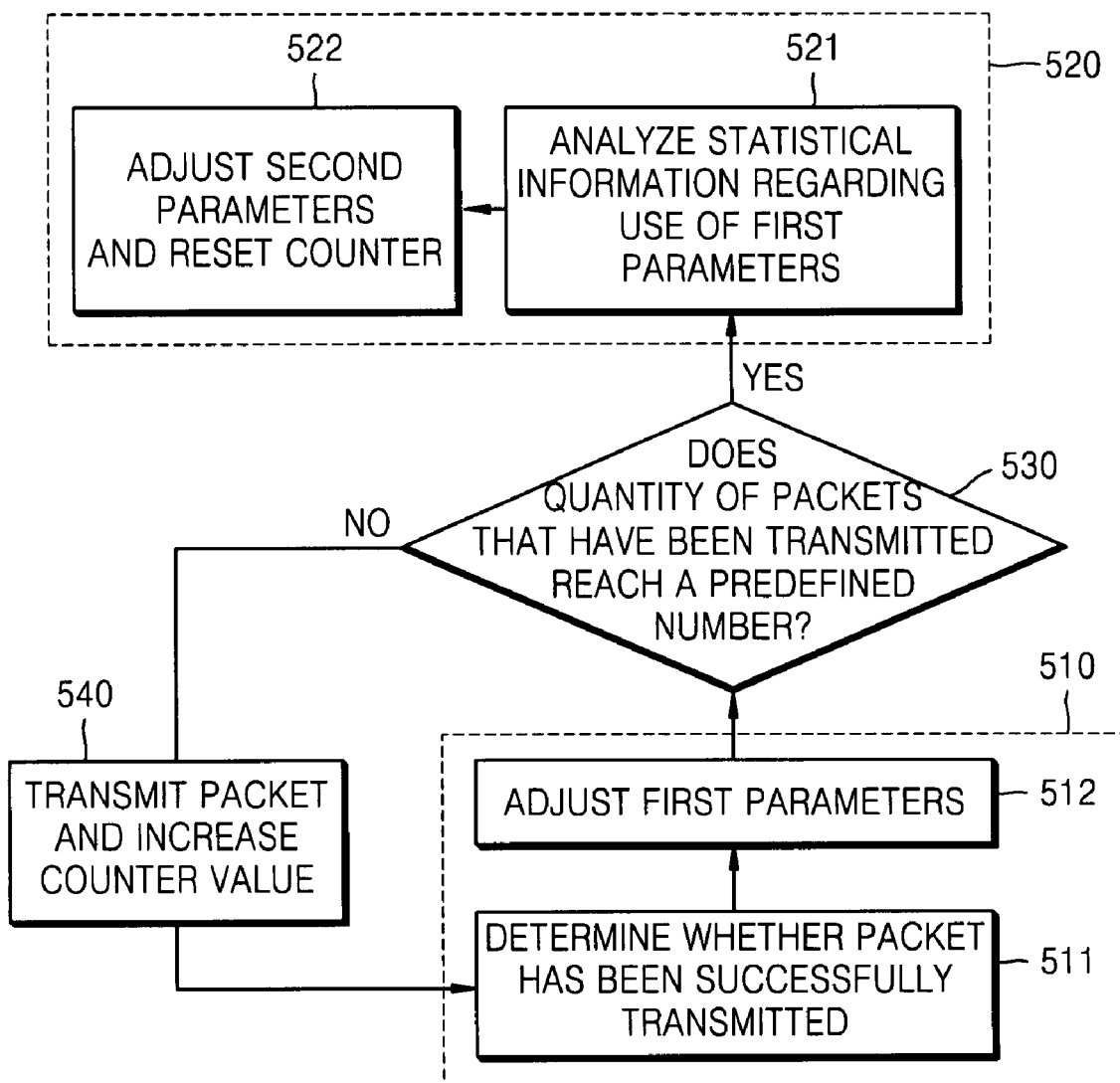
FIG. 5 is a flowchart illustrating a method of controlling parameters of a wireless data streaming system according to another exemplary embodiment of the present invention, and explains the relationship between the controlling of first parameters and the controlling of second parameters.

FIG. 5 is a flowchart illustrating a method of controlling parameters of a wireless data streaming system according to an exemplary embodiment of the present invention, and explains the relationship between the controlling of first parameters (operation 510) and the controlling of second parameters (operation 520). Referring to FIG. 5, the method involves operation 510 in which a plurality of first parameters are controlled, and operation 520 in which a plurality of second parameters are controlled based on statistical data regarding the use of the first parameters in the transmission of a predefined number of packets.

As part of the controlling of the first parameters, in operation 511, the transmission of packets according to current parameter settings is initiated, and it is determined whether the packets have been successfully transmitted by depending on whether an ACK has been received in return for the packets. In operation 512, the first parameters are appropriately adjusted according to the results of the determination so as to readily respond to a current channel state.

Thereafter, in operation 530, the quantity of packets which have been transmitted is determined with reference to a current count value of a counter which increases its count value by 1 whenever a packet is transmitted. If the determined packet quantity is less than a predefined value, the method proceeds to operation 540. In operation 540, a packet is transmitted according to the results of the adjustment performed in operation 512, and the count value of the counter is increased by 1. Operation 540 is repeatedly performed until the quantity of packets which have been transmitted exceeds the predefined value. On the other hand, if the determined packet quantity is already greater than the predefined value, statistical data regarding the use of the first parameters in the transmission of the predefined number of packets is analyzed. As described above, a reference value W is determined by using the statistical data in a predetermined function. The reference value W is compared with a predetermined threshold value which is determined in consideration of a required QoS. Then, in operation 522, the method proceeds to operation 306 or operation 307 illustrated in FIG. 3 according to the results of the comparison. Thereafter, the counter is reset, and the method is performed again.

FIG. 6 is a detailed flowchart illustrating the controlling of second parameters as performed in the method illustrated in FIG. 5, according to an exemplary embodiment of the present invention. Referring to FIG. 6, in operation 610, a reference value W representing a current channel state is calculated based on statistical data regarding the use of a plurality of first parameters in the transmission of a predefined number of packets. In detail, the reference value W is determined by counting the predefined number of packets transmitted according to each of a plurality of default values to which each of the first parameters can be set, and substituting the results of the counting for each of the first parameters and giving a plurality of weight values to the default values of the corresponding first parameter. For example, for a first parameter 'data rate', a plurality of weight values may be respectively given to a plurality of default data rates in such a manner that the weight value given to a high default data rate is greater than the weight value given to a lower default data rate. Then, the quantity of packets transmitted at each of the default data rates is determined. Thereafter, the determined packet quantities are multiplied by the respective weight values, and the results of the multiplication are added up, thereby obtaining the reference value W.

In operation 620, it is determined whether the current channel state is good or bad by comparing the reference value W with a predetermined threshold value which is determined in consideration of a required QoS. For example, if the reference value W is greater than the predetermined threshold value, the current channel state is determined to be good. On the contrary, if the reference value W is smaller than the predetermined threshold value, the current channel state is determined to be bad.

In operation 630, a plurality of second parameters are adjusted according to the results of the determination obtained in operation 620. In detail, if the current channel state is determined to be good, the second parameters are respectively adjusted to a plurality of values corresponding to a more efficient, but less stable channel state than the current channel state. Examples of the second parameters include 'forward error correction coding rate', 'interleaving depth', and 'interleaving packet size'. In particular, the second parameters 'forward error correction coding rate', 'interleaving depth', and 'interleaving packet size' are related to redundancy of data streams. Therefore, if the current channel state is determined to be good, it is expected that data will be properly transmitted even after the second parameters 'forward error correction coding rate', 'interleaving depth', and 'interleaving packet size' are reduced. On the contrary, if the current channel state is determined to be bad, the second parameters 'forward error correction coding rate', 'interleaving depth', and 'interleaving packet size' are increased, thereby enhancing the readiness to respond to errors and increasing data transmission success rate.

FIG. 7 is a block diagram of an apparatus 700 for controlling parameters of a wireless data streaming system according to an exemplary embodiment of the present invention. Referring to FIG. 7, the apparatus 700 includes a first parameter control unit 710, a calculation unit 720, and a second parameter control unit 730.

The first parameter control unit 710 controls a plurality of first parameters which are parameters that can be controlled in units of individual packets according to a current channel state for transmission of packets in a data stream. In detail, an actual data packet or a test data packet is transmitted, and it is determined whether the actual data packet or the test data packet has been successfully transmitted by determining whether an ACK is received in return for the actual data packet or the test data packet. If it is determined that the actual data packet or the test data packet has been successfully transmitted, the first parameters are respectively adjusted to a plurality of values corresponding to a more efficient, but less stable channel state than the current channel state. On the other hand, if it is determined that packet loss has occurred during the transmission of the actual data packet or the test data packet, the first parameters are respectively adjusted to a plurality of values corresponding to a more stable, but less efficient channel state than the current channel state.

The calculation unit 720 determines the quantity of packets which have been transmitted at each of a plurality of default settings of each of the first parameters, and determines a reference value W which represents the current channel state by using the determined packet quantities.

The second parameter control unit 730 controls a plurality of second parameters according to whether the current channel state is good or bad. It is determined whether the current channel state is good or bad by comparing the reference value W with a threshold value determined in consideration of a required QoS.

The present invention can be realized as hardware, firmware, software, or any combinations thereof, wherein the hardware is a physical architecture having electronic, electromagnetic, optical, electro-optic, mechanical, or electromechanical elements, the software is a logic structure, a method, a procedure, a program, a routine, a process, an algorithm, a formula, or a function, and the firmware is a logic structure, a method, a procedure, a program, a routine, a process, an algorithm, or a formula that can be installed or embedded in a hardware architecture (e.g., a flash memory, a ROM, or an EPROM). Examples of the firmware include microcode, a writable control store, and microprogrammed architecture. When the present invention is realized as software or firmware, a plurality of elements of the present invention correspond to code segments for performing necessary tasks, wherein the software/firmware may include code for performing operations of the present invention or code for emulating or simulating the operations. Programs or code segments may be stored in media which can be accessed by processors or by machine or may be transmitted via a transmission medium as either computer data signals that are carried by carrier waves or signals modulated by carriers. Media which can be read or accessed by processors or media which can be read or accessed by machine may be arbitrary media which can store and transmit data. Examples of the media which can be read or accessed by processors or the media which can be read or accessed by machine include electronic circuits, semiconductor memory devices, ROMs, flash memories, EPROMs, floppy disks, CD-ROMs, optical discs, hard discs, optical fiber media, and radio frequency (RF) links. The computer data signals may be arbitrary signals which can be transmitted via transmission media such as electronic network channels, optical fibers, the air, electromagnetic waves, and RF links. The code segments can be downloaded from a computer network such as the Internet or an intranet. The media which can be read and accessed by machine can be realized as manufactured goods. Also, the media which can be read and accessed by machine may include program code which can be executed in the corresponding media. Examples of the program code include machine-readable code which performs the operations of the present invention. Here, the term "data" refers to an arbitrary type of information (e.g., programs, code, and files) which is encoded so as to be readable by machine.

According to the exemplary embodiments of the present invention, it is possible to guarantee an efficient use of wireless network resources by controlling parameters of upper layers based on statistical information regarding parameters of lower layers. In addition, it is possible to enhance the quality of data transmission service by adaptively varying parameters according to a constantly changing channel environment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling parameters of a wireless data streaming system comprising:
controlling a first parameter, which can be controlled in units of individual packets, according to whether current packet transmission is successful;
transmitting a predefined number of packets using various values of the first parameter;
calculating a reference value indicating a current channel state based on the number of successfully transmitted packets; and
controlling a plurality of second parameters, which can be controlled in units of packet groups, based on the reference value,
wherein the calculating the reference value comprises multiplying the number of successfully transmitted packets transmitted at each of the various values of the first parameter by a weight value respectively given to said each of various values of the first parameter and adding up the results of the multiplications, and
wherein the controlling the plurality of second parameters comprises adjusting the plurality of second parameters to values selected for a more efficient and less stable channel state than the current channel when the reference value is greater than a predetermined threshold value, and adjusting the plurality of second parameters to values selected for a less efficient and more stable channel state than the current channel when the reference value is smaller than the predetermined threshold value.

2. The method of claim 1, wherein the first parameter is a parameter used in at least one of a physical layer and a medium access control (MAC) layer.

3. The method of claim 2, wherein the first parameter is one of transmission power, data rate, retry limits, and frame length.

4. The method of claim 1, wherein the plurality of second parameters comprise parameters used in at least one of a transport layer, a network layer, and an application layer.

5. The method of claim 4, wherein the plurality of second parameters comprise two or more of congestion window size, packet size, buffer size, forward error correction coding rate, and interleaving packet size.

6. The method of claim 1, wherein the controlling the plurality first parameter comprises:
transmitting an actual data packet or a test data packet using a current value of the first parameter; and
altering the current value of the first parameter according to whether the actual data packet or the test data packet has been successfully transmitted.

7. An apparatus for controlling parameters of a wireless data streaming system comprising:
a processor: and
a memory storing program code for implementing:
a first parameter control unit which controls a first parameter, which can be controlled in units of individual packets, according to whether current packet transmission is successful;
a calculation unit which transmits a predefined number of packets using various values of the first parameter and calculates a reference value indicating a current channel state based on a number of successfully transmitted packets; and
a second parameter control unit which controls a plurality of second parameters, which can be controlled in units of packet groups, based on the reference value,
wherein the calculation unit calculates the reference value by multiplying the number of successfully transmitted packets transmitted at each of the various values of the first parameter by a weight value respectively given to each of the various values of the first parameter, and adding up the results of the multiplication, and
wherein the second parameter control unit adjusts the plurality of second parameters to values selected for a more efficient and less stable channel state than the current channel when the reference value is greater than a predetermined threshold value, and adjusting the plurality of second parameters to values selected for a less efficient and more stable channel state than the current channel when the reference value is smaller than the predetermined threshold value.

8. The apparatus of claim 7, wherein the first parameter is a parameter used in at least one of a physical layer and a medium access control (MAC) layer.

9. The apparatus of claim 8, wherein the first parameter comprises one of transmission power, data rate, retry limits, and frame length.

10. The apparatus of claim 7, wherein the plurality of second parameters comprise parameters used in at least one of a transport layer, a network layer, and an application layer.

11. The apparatus of claim 10, wherein the plurality of second parameters comprise two or more of congestion window size, packet size, buffer size, forward error correction coding rate, and interleaving packet size.

12. The apparatus of claim 7, wherein the first parameter control unit transmits an actual data packet or a test data packet using a current value of the first parameter, and alters the current value of the first parameter according to whether the actual data packet or the test data packet has been successfully transmitted.

* * * * *